US008856352B2

(12) United States Patent
Revanuru et al.

(10) Patent No.: US 8,856,352 B2
(45) Date of Patent: Oct. 7, 2014

(54) SYSTEM AND METHOD FOR SUPPORTING ONE-WAY REMOTE METHOD INVOCATION FOR SESSION REPLICATION IN A SERVER CLUSTER (75) Inventors: Naresh Revanuru, Fremont, CA (US); Patrik Torstensson, Stockholm (SE); Prashant Agarwal, Sunnyvale, CA (US); Oleksandr Otenko, Winnersh (GB); Ballav Bihani, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/234,004

(22) Filed: Sep. 15, 2011

(65) Prior Publication Data

US 2012/0144045 A1 Jun. 7, 2012

Related U.S. Application Data (60) Provisional application No. 61/383,285, filed on Sep. 15, 2010, provisional application No. 61/384,227, filed on Sep. 17, 2010.

(51) Int. Cl.
*G06F 15/16* (2006.01)
*G06F 17/30* (2006.01)

(52) U.S. Cl.
CPC .... *G06F 17/30368* (2013.01); *G06F 17/30584* (2013.01)
USPC .......................................... 709/227; 709/200

(58) Field of Classification Search
USPC ....................................................... 709/227
See application file for complete search history.

(56) References Cited

U.S. PATENT DOCUMENTS

| 5,109,384 | A | 4/1992 | Tseung |
| 6,895,590 | B2 * | 5/2005 | Yadav ........................... 719/328 |
| 6,938,085 | B1 * | 8/2005 | Belkin et al. .................. 709/227 |
| 7,554,993 | B2 | 6/2009 | Modi et al. |
| 7,831,731 | B2 * | 11/2010 | Tang et al. ..................... 709/237 |
| 7,991,904 | B2 | 8/2011 | Melnyk et al. |
| 8,130,776 | B1 * | 3/2012 | Sundararajan et al. ....... 370/401 |
| 8,131,860 | B1 | 3/2012 | Wong et al. |
| 8,578,033 | B2 * | 11/2013 | Mallart ......................... 709/228 |
| 8,601,057 | B2 * | 12/2013 | Han et al. ...................... 709/204 |
| 2002/0174136 | A1 | 11/2002 | Cameron et al. |
| 2003/0014480 | A1 * | 1/2003 | Pullara et al. ................. 709/203 |
| 2003/0078958 | A1 | 4/2003 | Pace et al. |
| 2003/0120822 | A1 | 6/2003 | Langrind et al. |
| 2004/0177126 | A1 * | 9/2004 | Maine .......................... 709/217 |
| 2004/0205771 | A1 | 10/2004 | Sudarshan et al. |
| 2005/0021354 | A1 | 1/2005 | Brendle et al. |

(Continued)

*Primary Examiner* — Anthony Mejia
(74) *Attorney, Agent, or Firm* — Meyer IP Law Group (57) ABSTRACT

A system and method can support one-way Remote Method Invocation (RMI) session replication in a middleware machine environment, such as a server cluster. The server cluster can include a primary application server and a secondary application server. The primary application server receives a request with a session from a client, maintain the session information, and replicate the session information to a secondary application server using one-way Remote Method Invocation (RMI). The primary application server can then respond to the client based on the session information after receiving a return message of the one-way RMI from a network socket associate with the primary application server. The benefit of using one-way RMI is that the primary application server does not have to wait for an acknowledgment from the secondary application server instance, since the underlying transport protocol guarantees that the session data has been successfully transmitted to the second server instance.

20 Claims, 6 Drawing Sheets

(56) References Cited

U.S. PATENT DOCUMENTS

| | | | |
|---|---|---|---|
| 2005/0038801 A1 | 2/2005 | Colrain et al. | |
| 2005/0094577 A1 | 5/2005 | Ashwood-Smith | |
| 2005/0102412 A1 | 5/2005 | Hirsimaki | |
| 2005/0262215 A1 | 11/2005 | Kirov et al. | |
| 2006/0015600 A1 | 1/2006 | Piper | |
| 2006/0031846 A1 | 2/2006 | Jacobs et al. | |
| 2006/0143525 A1 | 6/2006 | Kilian | |
| 2006/0176884 A1* | 8/2006 | Fair et al. | 370/400 |
| 2006/0190602 A1* | 8/2006 | Canali et al. | 709/226 |
| 2006/0209899 A1 | 9/2006 | Cucchi et al. | |
| 2006/0294417 A1 | 12/2006 | Awashi et al. | |
| 2007/0198684 A1 | 8/2007 | Mizushima | |
| 2007/0203944 A1 | 8/2007 | Batra et al. | |
| 2008/0044141 A1 | 2/2008 | Willis et al. | |
| 2008/0098458 A2* | 4/2008 | Smith et al. | 726/3 |
| 2008/0140844 A1* | 6/2008 | Halpern | 709/226 |
| 2008/0286741 A1 | 11/2008 | Call | |
| 2009/0034537 A1 | 2/2009 | Colrain et al. | |
| 2009/0150647 A1 | 6/2009 | Mejdrich et al. | |
| 2009/0172636 A1* | 7/2009 | Griffith et al. | 717/113 |
| 2009/0182642 A1 | 7/2009 | Sundaresan | |
| 2009/0327471 A1 | 12/2009 | Astete et al. | |
| 2010/0138531 A1* | 6/2010 | Kashyap | 709/224 |
| 2010/0198920 A1 | 8/2010 | Wong et al. | |
| 2010/0199259 A1 | 8/2010 | Quinn et al. | |
| 2011/0029812 A1 | 2/2011 | Lu et al. | |
| 2011/0055510 A1 | 3/2011 | Fritz et al. | |
| 2011/0066737 A1* | 3/2011 | Mallart | 709/228 |
| 2011/0071981 A1 | 3/2011 | Ghosh et al. | |
| 2011/0119673 A1 | 5/2011 | Bloch et al. | |
| 2011/0161457 A1* | 6/2011 | Sentinelli et al. | 709/217 |
| 2011/0185021 A1* | 7/2011 | Han et al. | 709/204 |
| 2011/0228668 A1 | 9/2011 | Pillai et al. | |
| 2012/0023557 A1* | 1/2012 | Bevan et al. | 726/4 |
| 2012/0131330 A1* | 5/2012 | Tonsing et al. | 713/153 |
| 2012/0144045 A1* | 6/2012 | Revanuru et al. | 709/227 |
| 2012/0218891 A1* | 8/2012 | Sundararajan et al. | 370/231 |
| 2013/0004002 A1* | 1/2013 | Duchscher et al. | 381/315 |

\* cited by examiner

SYSTEM AND METHOD FOR SUPPORTING ONE-WAY REMOTE METHOD INVOCATION FOR SESSION REPLICATION IN A SERVER CLUSTER

CLAIM OF PRIORITY

This application claims the benefit of priority on U.S. Provisional Patent Application No. 61/383,285, titled "MIDDLEWARE MACHINE PLATFORM", filed Sep. 15, 2010; and U.S. Provisional Patent Application No. 61/384,227, titled "MIDDLEWARE MACHINE PLATFORM", filed Sep. 17, 2010, each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCED APPLICATIONS

This application is related to U.S. patent application Ser. No. 13/109,849, titled "SYSTEM AND METHOD FOR ZERO BUFFER COPYING IN A MIDDLEWARE ENVIRONMENT", filed May 17, 2011 and U.S. patent application Ser. No. 13/167,636, titled "SYSTEM AND METHOD FOR SUPPORTING LAZY DESERIALIZATION OF SESSION INFORMATION IN A SERVER CLUSTER", filed Jun. 23, 2011, each of which applications are herein incorporated by reference.

FIELD OF INVENTION

The present invention is generally related to computer systems and software such as middleware, and is particularly related to systems and methods for session replication in a middleware machine environment.

BACKGROUND

Within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments.

Session state can be used in the middleware machine platform for storing important user session information. A middleware machine system can replicate session state associated with user service request from one server instance to another server instance using Remote Method Invocation (RMI), in order to prevent the loss of user session information when one server instance fails. These are the generally areas that embodiments of the invention are intended to address.

SUMMARY

Described herein is a system and method for supporting one-way Remote Method Invocation (RMI) session replication in a middleware machine environment, such as a server cluster. The server cluster can include a primary application server and a secondary application server. The primary application server receives a request with a session from a client, maintains the session information, and replicates the session information to a secondary application server using one-way RMI. The primary application server can then respond to the client based on the session information after receiving a return message of the one-way RMI from a network socket associated with the primary application server. A benefit of using one-way RMI is that the primary application server does not have to wait for an acknowledgment from the secondary application server instance, since the underlying transport protocol guarantees that the session data has been successfully transmitted to the second server instance.

In accordance with an embodiment, a system and method can provide a middleware machine or similar platform. In accordance with an embodiment the system (referred to herein in some implementations as "Exalogic") comprises a combination of high performance hardware, together with an application server or middleware environment, to provide a complete Java EE application server complex which includes a massively parallel in-memory grid, can be provisioned quickly, and can scale on demand. In accordance with an embodiment, the system can be deployed as a full, half, or quarter rack, or other configuration, that provides an application server grid, storage area network, and InfiniBand network, which support the execution of an application server, middleware or other functionality.

DETAILED DESCRIPTION

As described above, within any large organization, over the span of many years the organization often finds itself with a sprawling IT infrastructure that encompasses a variety of different computer hardware, operating-systems, and application software. Although each individual component of such infrastructure might itself be well-engineered and well-maintained, when attempts are made to interconnect such components, or to share common resources, it is often a difficult administration task. In recent years, organizations have turned their attention to technologies such as virtualization and centralized storage, and even more recently cloud computing, which can provide the basis for a shared infrastructure. However, there are few all-in-one platforms that are particularly suited for use in such environments.

To address this, described herein is a system and method for providing a middleware machine or similar platform. In accordance with an embodiment the system (referred to herein in some implementations as "Exalogic") comprises a combination of high performance hardware, e.g. 64-bit processor technology, high performance large memory, and redundant InfiniBand and Ethernet networking; together with an application server or middleware environment, such as WebLogic Suite, to provide a complete Java EE application server complex which includes a massively parallel in-memory grid, can be provisioned quickly, and can scale on demand. In accordance with an embodiment, the system can be deployed as a full, half, or quarter rack, or other configuration, that provides an application server grid, storage area network, and InfiniBand network. The middleware machine software can provide application server, middleware and other functionality such as, for example, WebLogic Server, JRockit or Hotspot JVM, Oracle Linux or Solaris, and Oracle VM. In accordance with an embodiment, the system can include a plurality of compute nodes, InfiniBand switch gateway, and storage nodes or units, communicating with one another via an InfiniBand network.

Figure 1:
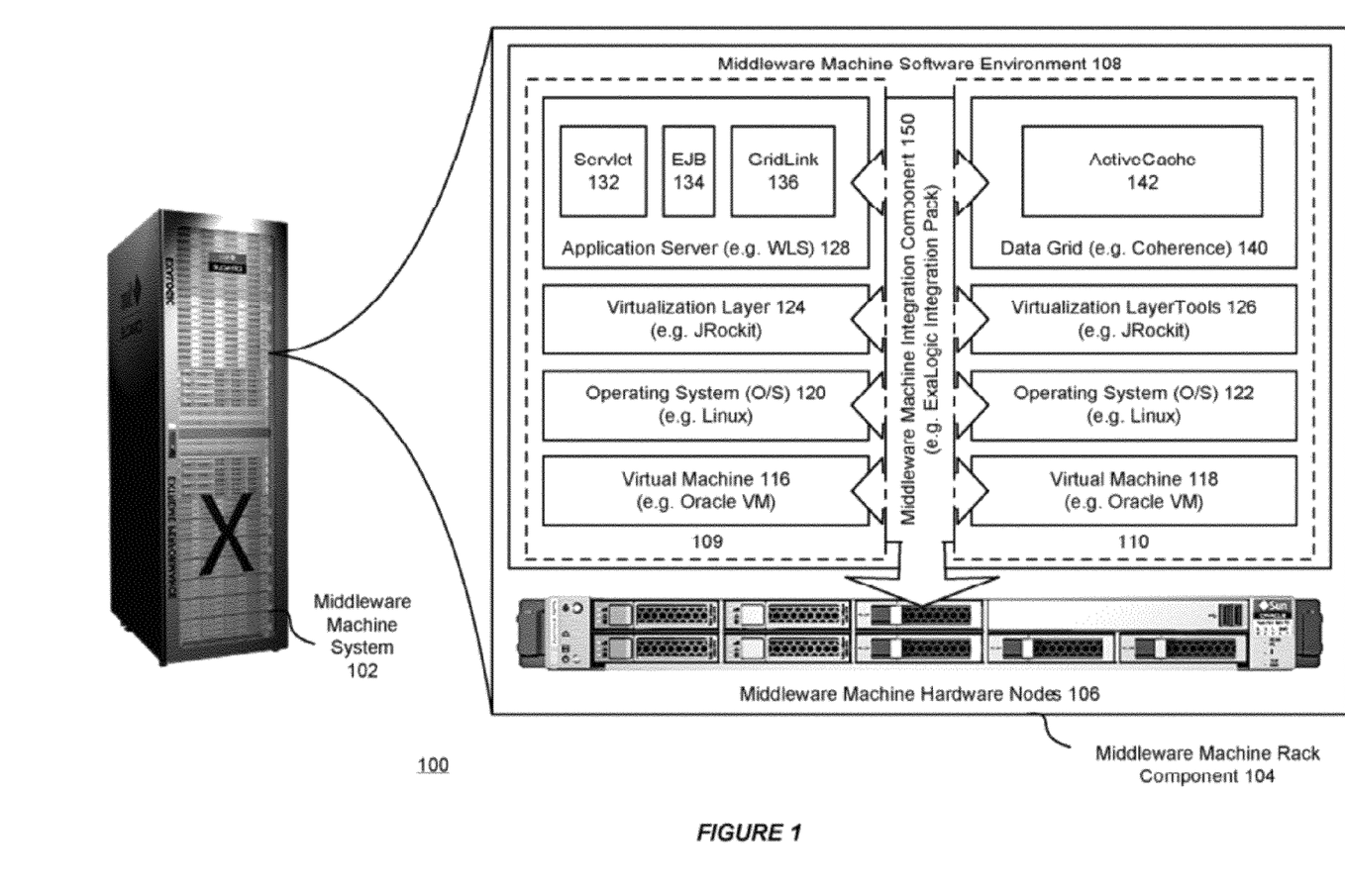
FIG. 1 shows an illustration of a middleware machine environment in accordance with an embodiment.

FIG. 1 shows an illustration of a middleware machine environment 100, in accordance with an embodiment. As shown in FIG. 1, each middleware machine system 102 includes several middleware machine rack components 104, each of which includes a combination of high-performance middleware machine hardware nodes 106 (e.g., 64-bit processors, high performance large memory, and redundant InfiniBand and Ethernet networking), and a middleware machine software environment 108. The result is a complete application server environment which can be provisioned in minutes rather than days or months, and which can scale on demand. In accordance with an embodiment, each middleware machine system can be deployed as a full, half, or quarter rack, or other configuration of rack components, and several middleware machine systems can be coupled together, again using InfiniBand, to create larger environments. Each middleware machine software environment can be provisioned with several application server or other software instances, for example as shown in FIG. 1, an application server instance 109 could comprise a virtual machine 116, operating system 120, virtualization layer 124, and application server layer 128 (e.g. WebLogic, including servlet 132, EJB 134, and Gridlink 136 containers); while another application server instance 110 could comprise a virtual machine 116, operating system 120, virtualization layer 124, and data grid layer 140 (e.g. Coherence, including an active cache 142). Each of the instances can communicate with one another, and with both its middleware machine hardware node, and other nodes, using a middleware machine integration component 150, such as an ExaLogic integration pack, which itself provides several optimization features, such as support for InfiniBand and other features, as described in further detail below.

Figure 2:
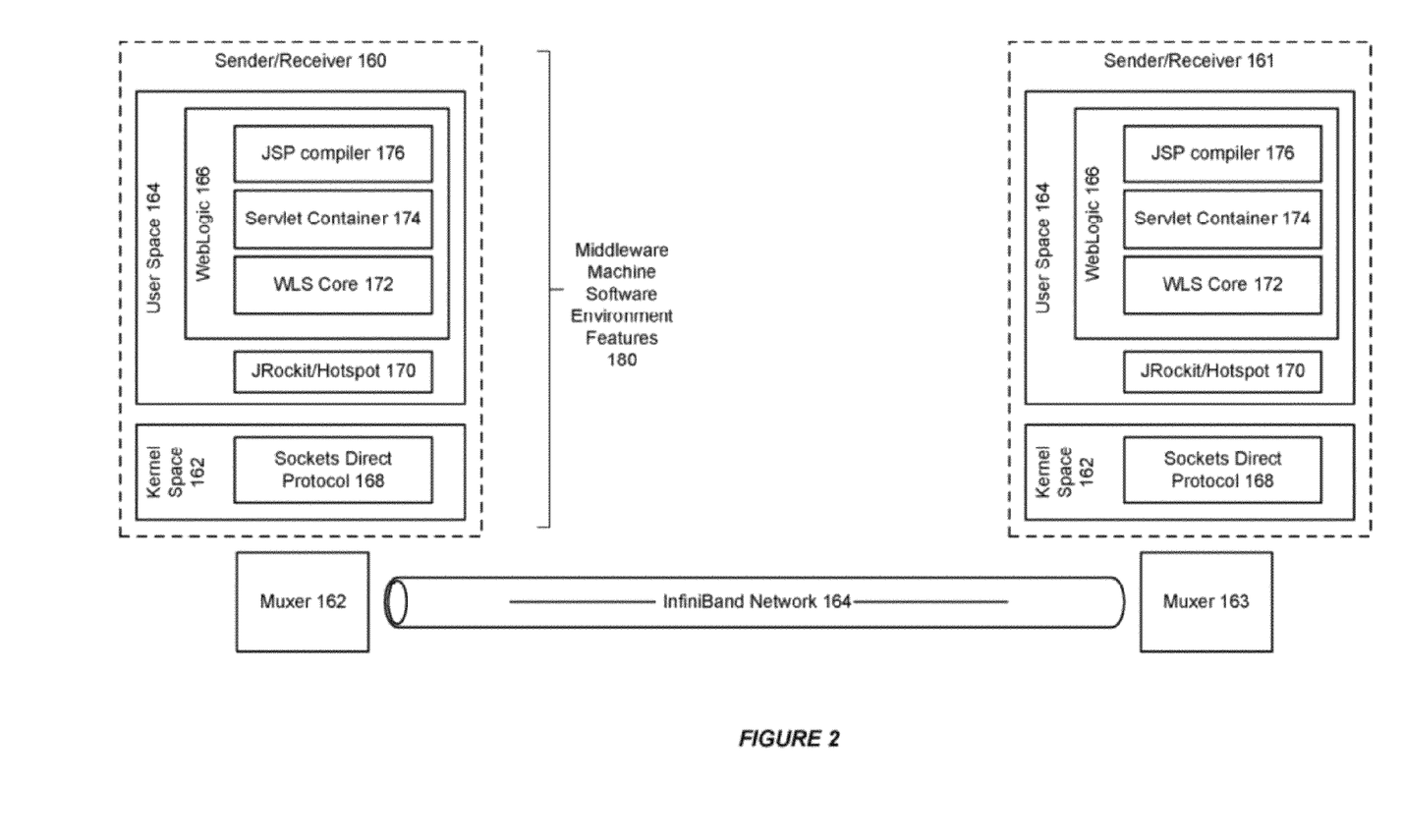
FIG. 2 shows another illustration of a middleware machine platform or environment in accordance with an embodiment.

FIG. 2 shows another illustration of a middleware machine platform or environment, in accordance with an embodiment. As shown in FIG. 2, each application server instance can act as a sender and/or receiver 160, 161 within the middleware machine environment. Each application server instance is also associated with a muxer 162, 163, that allows application servers to communicate with one another via an InfiniBand network 164. In the example shown in FIG. 2, an application server instance can include a kernel space 162, user space 164, and application server (e.g. WebLogic space) 166, which in turn can includes a sockets direct protocol 168, JVM (e.g. JRockit/Hotspot layer) 170, WLS core 172, servlet container 174, and JSP compiler 176. In accordance with other examples, other combinations of middleware-type software can be included.

One-way Remote Method Invocation (RMI) Session Replication

A middleware machine platform or environment can include one or more clusters of application servers. The system is able to recover from service failures, so that the middleware machine platform can provide high availability. Session state is used in the middleware machine platform for storing important user session information. The system can replicate session state associated with user service request from one server instance to another. The primary application server creates a primary session state on the server to which the client first connects, and a secondary replica on another server instance in the cluster. The replica is kept up-to-date so that it can be used if the primary application server, for example the server that hosts the servlet, fails.

In accordance with one embodiment, the system can support one-way Remote Method Invocation (RMI) session replication in a server cluster. Using one-way RMI session replication, the primary application server does not have to wait for a acknowledgment from the secondary application server instance. An underlying transport protocol can guarantee that the session data has been successfully transmitted to the second server instance, once a return message from a network socket associated with the underlying transport protocol is received at the primary application server.

Figure 3:
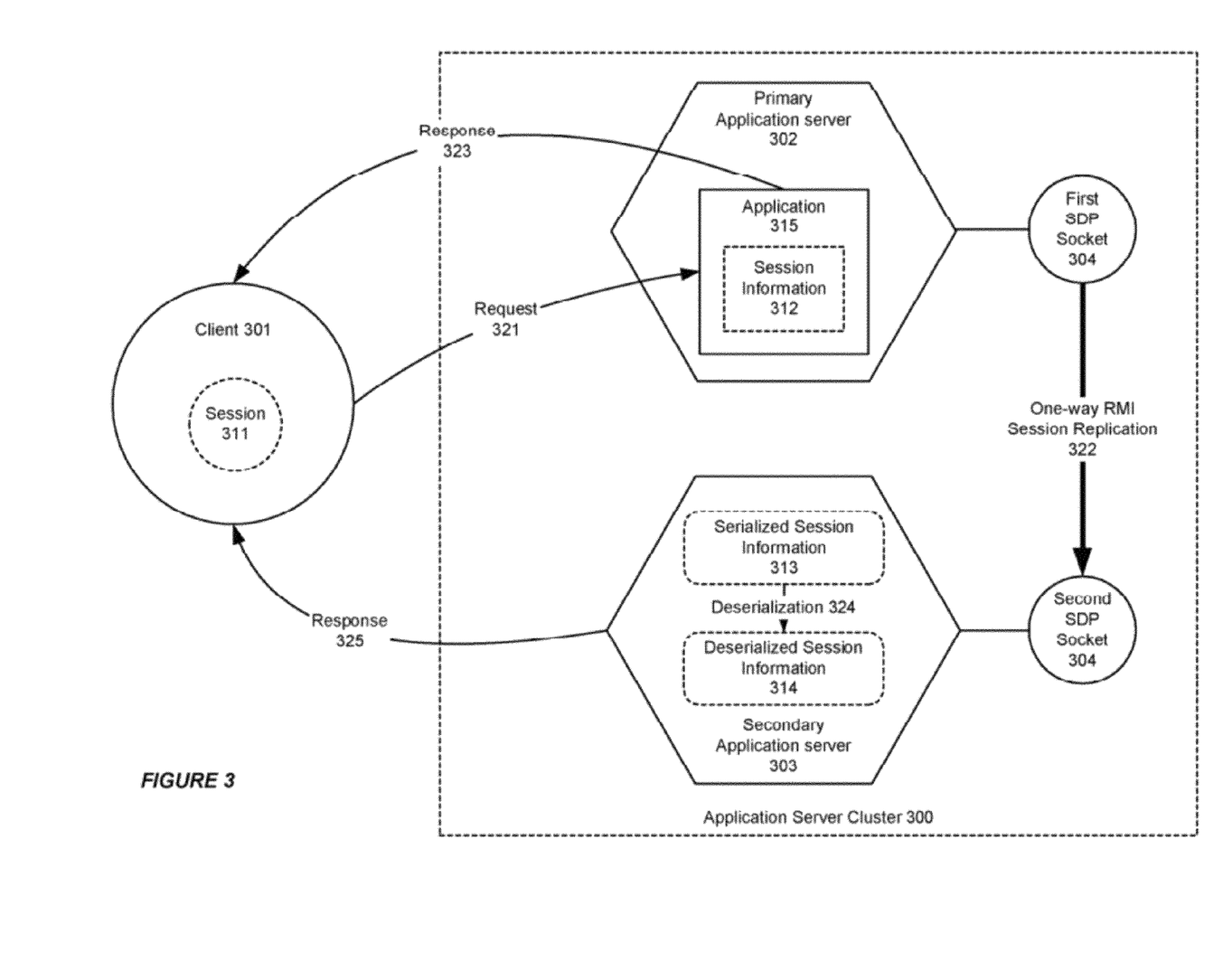
FIG. 3 shows an illustration of a system to support one-way RMI session replication in a middleware machine environment in accordance with an embodiment.

FIG. 3 shows an illustration of a system to support one-way RMI session replication in a middleware machine environment in accordance with an embodiment. As shown in FIG. 3, a client 301 can interact with a server cluster 300 that includes a primary application server 302 and a secondary application server 303. The primary application server operates to receive a request associated with a session 311 from the client at step 321, and maintains session information 312 associated with the session.

In accordance with an embodiment, a one-way RMI session replication step 322 can be performed in order to replicate the session information from the primary application server to the secondary application server. The one-way RMI session replication can be implemented based on socket direct protocol (SDP). As shown in FIG. 3, in order to support one-way RMI session replication, a first SDP socket 304 can be set up on the primary application server side and a second SDP socket 305 can be set up on the secondary application server side. After successfully completing the one-way RMI session replication step, the primary application server can respond to the client based on the session information at step 323.

In accordance with an embodiment, the primary application server can serialize the session information before it is replicated to the secondary application server. The serialization of the session information is a process of converting a complex data structure, such as a parallel arrangement of data, into a serial form. The parallel arrangement of data transmits a number of bits at a time along parallel channels, while the serial form transmits one bit at a time. Serializing session data introduces some overhead for replicating the session state. The overhead increases as the size of serialized objects grows. For example, if a user plans to create very large objects in a HTTP session, the performance of a servlet may need to be tested to ensure that performance is acceptable.

In accordance with an embodiment, the session information can be maintained on the secondary application server in the form of serialized session information 313. Additionally, the secondary application server operates to generate deserialized session information 314 based on the serialized session information at step 324. When the primary application server fails, the secondary application server, or another application server in the middleware environment, can use the deserialized session information to respond to the client at step 325.

In accordance with an embodiment, RMI, such as JAVA RMI, is an application programming interface that performs the object-oriented equivalent of remote procedure call (RPC). RMI can be supported by the virtual machines, such as JAVA virtual machines, running underneath the application servers. Different data transport protocols can be automatically set up by the virtual machines for transmitting the session information across the server cluster. For example, the JAVA virtual machine can set up TCP sockets using the TCP/IP protocol, or SDP sockets using the SDP protocol.

When TCP sockets are used for replicating session information in the server cluster, the primary application server has no knowledge on when the secondary application server will actually copy the session information stored in an operating system (OS) buffer unless the primary application server receives an acknowledgement from the secondary application server. Hence, the primary application server has to wait for an acknowledgment from the secondary application server to ensure that the session information has been successfully replicated before responding to the client.

When SDP sockets are used for replicating session information, only one-way RMI is needed. The SDP transport protocol can guarantee that the session data has been successfully transmitted to the second server instance, once a return message from the SDP socket is received at the primary application server. Hence, the primary application server does not have to wait for an acknowledgment from the secondary application server instance before responding to the client.

In one embodiment, the virtual machines can automatically set up a data transport protocol based on the underlying network. For example, the system can automatically set up a SDP socket instead of a TCP socket if an InfiniBand network is detected. Alternatively, the application server can set up with a flag that directs the virtual machine to set up a SDP socket.

Figure 4:
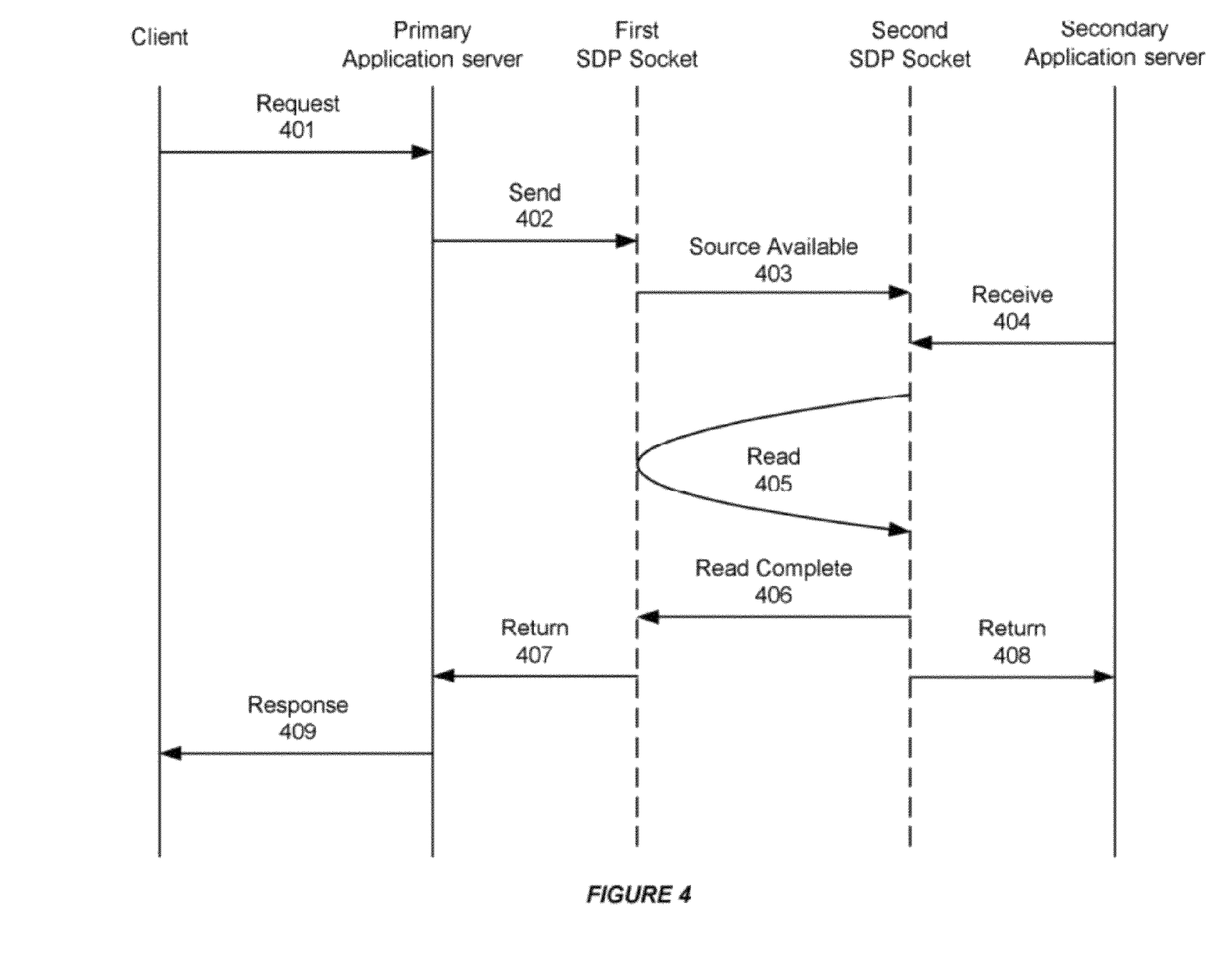
FIG. 4 illustrates an exemplary flow chart for performing session replication using SDP sockets in a middleware machine environment in accordance with an embodiment.

FIG. 4 illustrates an exemplary flow chart for performing session replication using SDP sockets in a middleware machine environment in accordance with an embodiment. As shown in FIG. 4, at step 401, a primary application server receives a request associated with a session from a client. After receiving the request, the primary application server can maintain the session information and performs a one-way RMI session replication. At step 402, the primary application server can initiate a send call to a first SDP socket, which is associated with a primary application server, to start transmitting the session data. Then, at step 403, the first SDP socket can inform the second SDP socket, which is associated with a secondary application server, that the session information in the source is available. After receiving such information, the secondary application server can instruct the second SDP socket to receive the session data at step 404. The second SDP socket can then, at step 405, perform a read operation such as a remote direct memory access (RDMA) read call to grab the session data from a buffer associated the primary application server, and, at step 406, to inform the first SDP socket when the read operation is completed. At the end of the one-way RMI session replication, the first SDP socket sends a return message to the primary application server at step 407. Separately, the second SDP socket also sends a return message to the secondary application server at step 408. Finally, at step 409, the primary application server can respond to the client based on the session information without a need to receive acknowledgement from the secondary application server.

Figure 5:
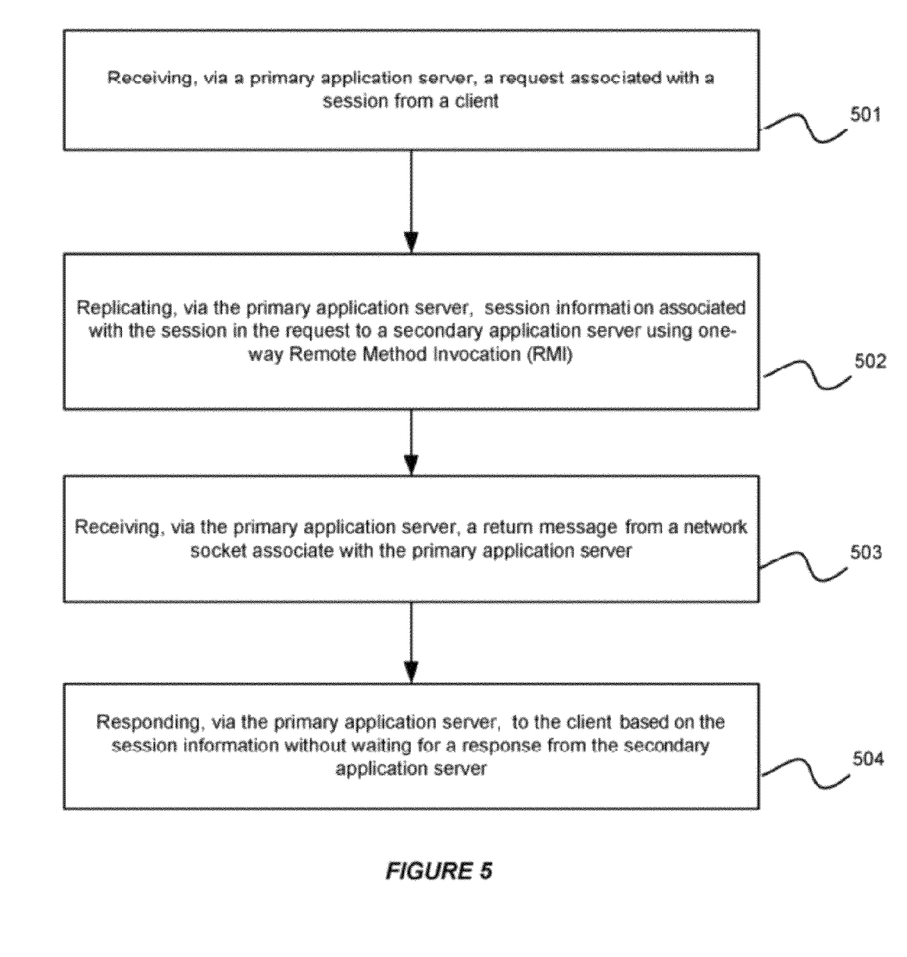
FIG. 5 illustrates an exemplary flow chart for supporting one-way RMI session replication in a middleware machine environment in accordance with an embodiment.

FIG. 5 illustrates an exemplary flow chart for supporting one-way RMI session replication in a middleware machine environment in accordance with an embodiment. As shown in FIG. 5, at step 501, a primary application server receives a request associated with a session from a client. The primary application server can then, at step 502, maintain the session information and performs a one-way RMI session replication to a secondary application server. After the one-way RMI session replication completes, at step 503, the primary application server receives a return message from a network socket associate with the primary application server. Finally, at step 504, the primary application server can respond to the client based on the session information without a need to receive acknowledgement from the secondary application server.

Multiple Replication Channels

In accordance with an embodiment, multiple replication channels can be used to perform session replication between the primary application server and different secondary application servers.

Figure 6:
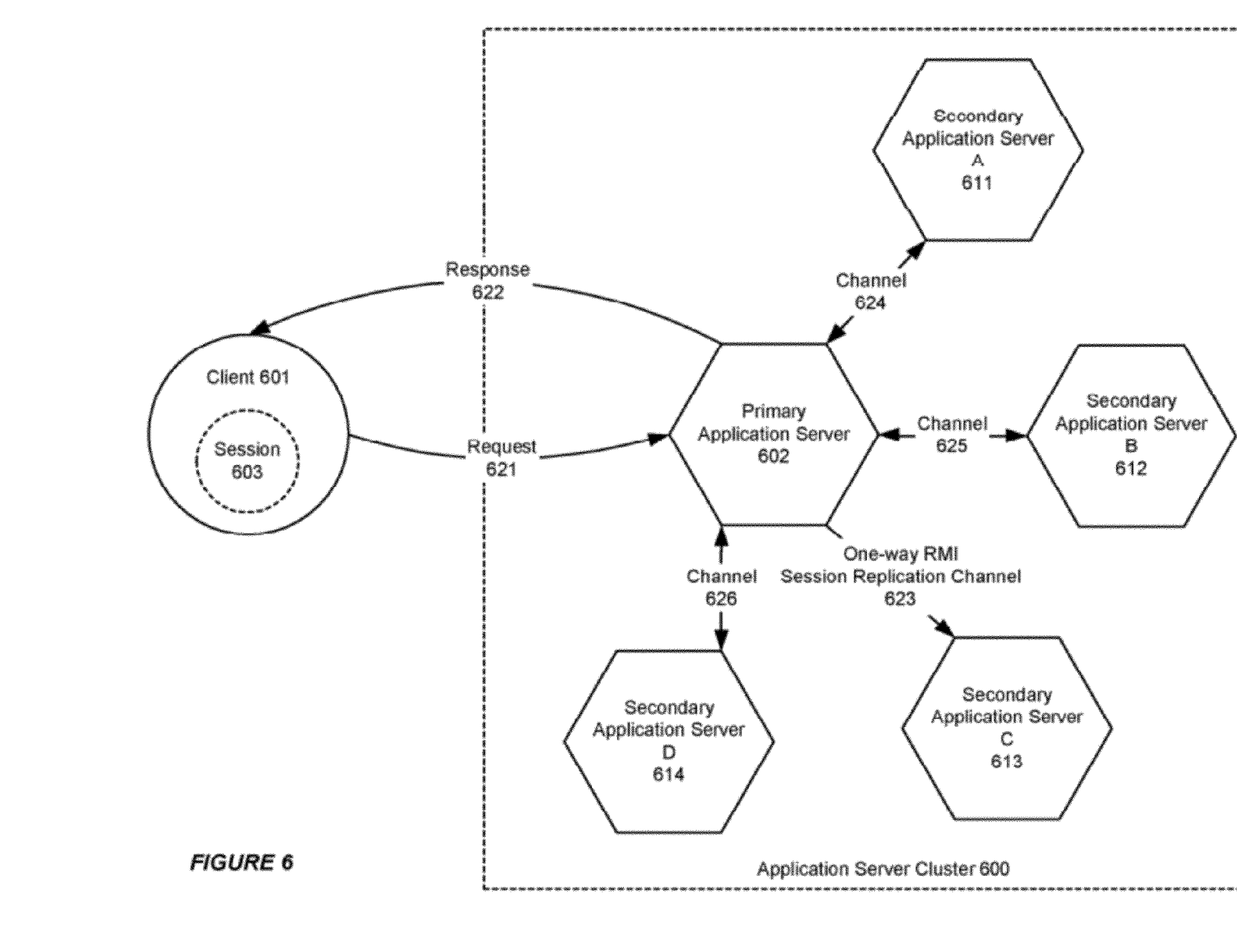
FIG. 6 shows an illustration of a system to support multiple replication channels for session replication in a middleware machine environment in accordance with an embodiment.

FIG. 6 shows an illustration of a system to support multiple replication channels for session replication in a middleware machine environment in accordance with an embodiment. As shown in FIG. 6, a client 601 can interact with a server cluster 600 that includes a primary application server 602 and several secondary application servers 611-614. The primary application server operates to receive a request associated with a session 603 from the client at step 621, and responds to the client at step 622, once the session information is successfully replicated to at least one of the secondary application servers.

In accordance with an embodiment, the system can configure multiple replication channels using different replication mechanism based on different data transport protocols. As shown in FIG. 6, the primary application server can perform one-way RMI session replication through a replication channel 623 to replication session information to a secondary application server C based on SDP protocol. Additionally, the primary application server can use other channels 624-626 that are configured to use TCP/IP protocol to replicate session information to the secondary application servers A, B and D. However, when a channel is configured with TCP/IP protocol, the primary application server needs to wait for a RMI response from the secondary application server to ensure the completion of the session replication.

When one-way RMI session replication is configured in a particular channel, the primary application server can closely monitor the operations in the particular channel that is handling the one-way session replication, in order to ensure that the primary application server is timely informed once the one-way RMI session replication is completed, in order to further improve efficiency. Additionally, the system can ensure that all the session information, which may be transmitted separately, are transmitted through the same channel, in order to prevent issues such as incomplete session information when the primary application server fails.

In accordance with an embodiment, a SDP socket can be automatically created for the primary application server detects that an InfiniBand network is associated with a particular channel. Also, using one-way RMI session replication, network failure does not affect the session replication since the primary application server can be certain that the session information has been successfully replicated to the secondary application server, as soon as the one-way RMI call returns. The chance that the secondary application server loses the session after a successful session replication is rare. Additionally, when a failure happens during the one-way RMI session replication, the system can throw an exception and then the primary application server can take necessary steps to replicate the session information using other available replication channels.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting session replication in a server cluster, comprising:
receiving, via a primary application server, a request associated with a session from a client;
replicating, via the primary application server, session information associated with the session in the request to a secondary application server using an underlying transport protocol which comprises one-way remote method invocation (RMI) session replication based on a socket direct protocol (SDP) between a first SDP socket on the primary application server and a second SDP socket on the secondary application server, wherein the underlying transport protocol guarantees that the session information is transmitted to the secondary application server once a return message from a network socket associated with the underlying transport protocol is received at the primary application server, and wherein, in accordance with the underlying transport protocol,
the primary application server initiates a send call to the first SDP socket to start transmitting the session information,
the first SDP socket informs the second SDP socket that the session information is available,
the secondary application server instructs the second SDP socket to receive the session data,
the second SDP socket performs a read operation using remote direct memory access (RDMA) to read the session data from a buffer associated the primary application server,
the second SDP socket informs the first SDP socket when read operation is completed, and
the first SDP socket sends a return message to the primary application server, and
the second SDP socket sends a return message to the secondary application server; and
responding, via the primary application server, to the client based on the session information without waiting for an acknowledgement from the secondary application server.

2. The method according to claim 1, further comprising:
serializing the session information by the primary application server before it is replicated to the secondary application server.

3. The method according to claim 2, further comprising:
allowing the secondary application server to deserialize the serialized session information before responding to the client, when the primary application server fails.

4. The method according to claim 1, further comprising:
allowing a virtual machine that runs underneath the primary application server to automatically set up the first SDP socket.

5. The method according to claim 4, further comprising:
allowing a virtual machine that runs underneath the secondary application server to automatically set up the second SDP socket.

6. The method according to claim 1, further comprising:
allowing the primary application server to select one of multiple replication channels to replicate the session information to at least one of multiple secondary application servers.

7. The method according to claim 6, further comprising:
allowing different data transport protocol to be used in different replication channels.

8. The method according to claim 6, further comprising:
ensuring that all session information in a particular session is replicated through a particular channel that is configured for performing one-way RMI session replication.

9. A system for supporting in-memory session replication in a server cluster, comprising:
one or more microprocessors,
a primary application server running on the one or more microprocessors, wherein the primary application server is configured to receive a request associated with a session from a client;
wherein the primary application server is configured to replicate session information associated with the session in the request to a secondary application server using an underlying transport protocol which comprises one-way remote method invocation (RMI) session replication based on a socket direct protocol (SDP) between a first SDP socket on the primary application server side and a second SDP socket on the secondary application server side, wherein the underlying transport protocol guarantees that the session information is transmitted to the secondary application server once a return message from a network socket associate with the underlying transport protocol is received at the primary application server, and wherein, in accordance with the underlying transport protocol, the primary application server initiates a send call to the first SDP socket to start transmitting the session information, the first SDP socket informs the second SDP socket that the session information is available, the secondary application server instructs the second SDP socket to receive the session data, the second SDP socket performs a read operation using remote direct memory access (RDMA) to read the session data from a buffer associated the primary application server, the second SDP socket informs the first SDP socket when read operation is completed, and the first SDP socket sends a return message to the primary application server, and the second SDP socket sends a return message to the secondary application server; and wherein the primary application server is configured to respond to the client based on the session information without waiting for an acknowledgement from the secondary application server.

10. The method according to claim 1, further comprising: keeping, via the secondary application server, the replicated session information up-to-date so that the replicated session information can be used if the primary application server fails.

11. The method according to claim 1, further comprising: receiving, via the primary application server, an acknowledgement from the secondary application server that the secondary application server has copied the session information stored in an operating system (OS) buffer on the primary application server.

12. The method according to claim 1, further comprising: sending, via a network socket associated with the underlying transport protocol, a return message to the primary application server after transmitting the session information to the secondary application server.

13. The system according to claim 9, wherein:
the secondary application server operates to keep the replicated session information up-to-date so that the replicated session information can be used if the primary application server fails.

14. The system according to claim 9, wherein:
the primary application server responds to an acknowledgement from the secondary application server that the secondary application server has copied the session information stored in an operating system (OS) buffer on the primary application server.

15. The system according to claim 9, wherein:
a network socket associated with the underlying transport protocol operates to send a return message to the primary application server after transmitting the session information to the secondary application server.

16. A non-transitory machine readable medium having instructions stored thereon for supporting session replication in a server cluster, which instructions, when executed cause a system to perform steps comprising:

receiving, via a primary application server, a request associated with a session from a client;

replicating, via the primary application server, session information associated with the session in the request to a secondary application server using an underlying transport protocol which comprises one-way remote method invocation (RMI) session replication based on a socket direct protocol (SDP) between a first SDP socket on the primary application server and a second SDP socket on the secondary application server, wherein the underlying transport protocol guarantees that the session information is transmitted to the secondary application server once a return message from a network socket associated with the underlying transport protocol is received at the primary application server, and wherein, in accordance with the underlying transport protocol, the primary application server initiates a send call to the first SDP socket to start transmitting the session information, the first SDP socket informs the second SDP socket that the session information is available, the secondary application server instructs the second SDP socket to receive the session data, the second SDP socket performs a read operation using remote direct memory access (RDMA) to read the session data from a buffer associated the primary application server, the second SDP socket informs the first SDP socket when read operation is completed, and the first SDP socket sends a return message to the primary application server, and the second SDP socket sends a return message to the secondary application server; and responding, via the primary application server, to the client based on the session information without waiting for an acknowledgement from the secondary application server.

17. The non-transitory machine readable medium of claim 16, having further instructions stored thereon, which instructions, when executed cause a system to perform further steps comprising:
serializing the session information by the primary application server to generate serialized session information before the session information is replicated to the secondary application server.

18. The non-transitory machine readable medium of claim 17, having further instructions stored thereon, which instructions, when executed cause a system to perform further steps comprising:
deserializing the serialized session information with the secondary application server.

19. The non-transitory machine readable medium of claim 16, having further instructions stored thereon, which instructions, when executed cause a system to perform further steps comprising:
allowing a virtual machine that runs underneath the primary application server to automatically set up the first SDP socket.

20. The non-transitory machine readable medium of claim 16 having further instructions stored thereon, which instructions, when executed cause a system to perform further steps comprising:
allowing the primary application server to select one of multiple replication channels to replicate the session information to at least one of multiple secondary application servers.

* * * * *

UNITED STATES PATENT AND TRADEMARK OFFICE
CERTIFICATE OF CORRECTION

PATENT NO. : 8,856,352 B2
APPLICATION NO. : 13/234004
DATED : October 7, 2014
INVENTOR(S) : Revanuru et al.

It is certified that error appears in the above-identified patent and that said Letters Patent is hereby corrected as shown below:

In The Drawings

In figure 1, under Reference Numeral 132, line 1, delete " Servlet " and insert -- Servlet --, therefor.

In figure 1, under Reference Numeral 136, line 1, delete " GridLink " and insert -- GridLink --, therefor.

In figure 1, under Reference Numeral 150, line 1, delete " Component " and insert -- Component --, therefor.

In figure 1, under Reference Numeral 142, line 1, delete " ActiveCache " and insert -- ActiveCache --, therefor.

In figure 5, under Reference Numeral 502, line 1, delete " Information " and insert -- information --, therefor.

In figure 6, under Reference Numeral 611, line 1, delete " Secondary " and insert -- Secondary --, therefor.

Signed and Sealed this
Twenty-eighth Day of April, 2015

Michelle K. Lee
*Director of the United States Patent and Trademark Office*

UNITED STATES PATENT AND TRADEMARK OFFICE
CERTIFICATE OF CORRECTION

PATENT NO. : 8,856,352 B2  Page 1 of 2
APPLICATION NO. : 13/234004
DATED : October 7, 2014
INVENTOR(S) : Revanuru et al.

It is certified that error appears in the above-identified patent and that said Letters Patent is hereby corrected as shown below:

On the title page, in the illustrative figure, under Reference Numeral 132, line 1, delete " Servlet " and insert -- Servlet --, therefor.

On the title page, in the illustrative figure, under Reference Numeral 136, line 1, delete " GridLink " and insert -- GridLink --, therefor.

On the title page, in the illustrative figure, under Reference Numeral 150, line 1, delete " Component " and insert -- Component --, therefor.

On the title page, in the illustrative figure, under Reference Numeral 142, line 1, delete " ActiveCache " and insert -- ActiveCache --, therefor.

In The Drawings

In figure 1, under Reference Numeral 132, line 1, delete " Servlet " and insert -- Servlet --, therefor.

In figure 1, under Reference Numeral 136, line 1, delete " GridLink " and insert -- GridLink --, therefor.

This certificate supersedes the Certificate of Correction issued April 28, 2015.

Signed and Sealed this
Nineteenth Day of May, 2015

Michelle K. Lee
*Director of the United States Patent and Trademark Office*

CERTIFICATE OF CORRECTION (continued)
U.S. Pat. No. 8,856,352 B2

In figure 1, under Reference Numeral 150, line 1, delete " Component " and insert -- Component --, therefor.

In figure 1, under Reference Numeral 142, line 1, delete " ActiveCache " and insert -- ActiveCache --, therefor.

In figure 5, under Reference Numeral 502, line 1, delete " information " and insert -- information --, therefor.

In figure 6, under Reference Numeral 611, line 1, delete " Secondary " and insert -- Secondary --, therefor.